United States Patent [19]

Pletscher

[11] 4,167,352
[45] Sep. 11, 1979

[54] APPARATUS FOR THE RELEASABLE FORCE-LOCKING OF TWO TELESCOPIC TUBES, ESPECIALLY FOR CLAMPING THE STEERING HOUSING TUBE IN THE STEERING FORK TUBE OF A BICYCLE

[75] Inventor: Oskar Pletscher, Marthalen, Switzerland

[73] Assignee: Gebrueder Pletscher, Marthalen, Switzerland

[21] Appl. No.: 945,688

[22] Filed: Sep. 25, 1978

[30] Foreign Application Priority Data

Oct. 6, 1977 [AT] Austria ............................. 87135/77

[51] Int. Cl.² ............................................. F16B 2/14
[52] U.S. Cl. .................................... 403/104; 403/369; 403/374; 85/66
[58] Field of Search ............... 403/374, 369, 370, 104, 403/409, 366; 85/66, 74; 248/412; 279/2 R

[56] References Cited

U.S. PATENT DOCUMENTS

| | | | |
|---|---|---|---|
| 2,468,867 | 5/1949 | Collins | 279/2 |
| 3,561,798 | 2/1971 | Redfern | 403/369 |
| 4,095,911 | 6/1978 | Lacroix | 403/104 |

*Primary Examiner*—Andrew V. Kundrat
*Attorney, Agent, or Firm*—Werner W. Kleeman

[57] ABSTRACT

An apparatus for the releasable, force-locking connection of two telescopically arranged tubes, especially for clamping the steering housing tube in the steering fork tube of a bicycle or the like, comprising an expanding cone axially displaceable within the tube defining an inner tube by means of a threaded spindle. In order to avoid, during clamping, deformation of the inner tube and thus frictional connection between both tubes along only a circular engagement line at the lower end of the inner tube and to eliminate the effect of the unavoidable play between the outer diameter of the inner tube and the inner diameter of the outer tube, the outer surface of the expanding cone bears against wedges. The latter are each arranged in a respective guide slot formed at the inner tube, extending parallel to the lengthwise axis of the tubes and having a closed contour. The wedges can be outwardly displaced by means of the expanding cone, and the longitudinal central plane of at least one of the guide slots and its wedge is arranged in offset relationship with regard to the axis of the tubes. Owing to the frictional connection which is distributed in axial direction it is possible, with this apparatus, for clamped tubes to take-up the larger bending moments of the threaded spindle with the same tightening moment and to transmit larger torque or rotational moments.

10 Claims, 3 Drawing Figures

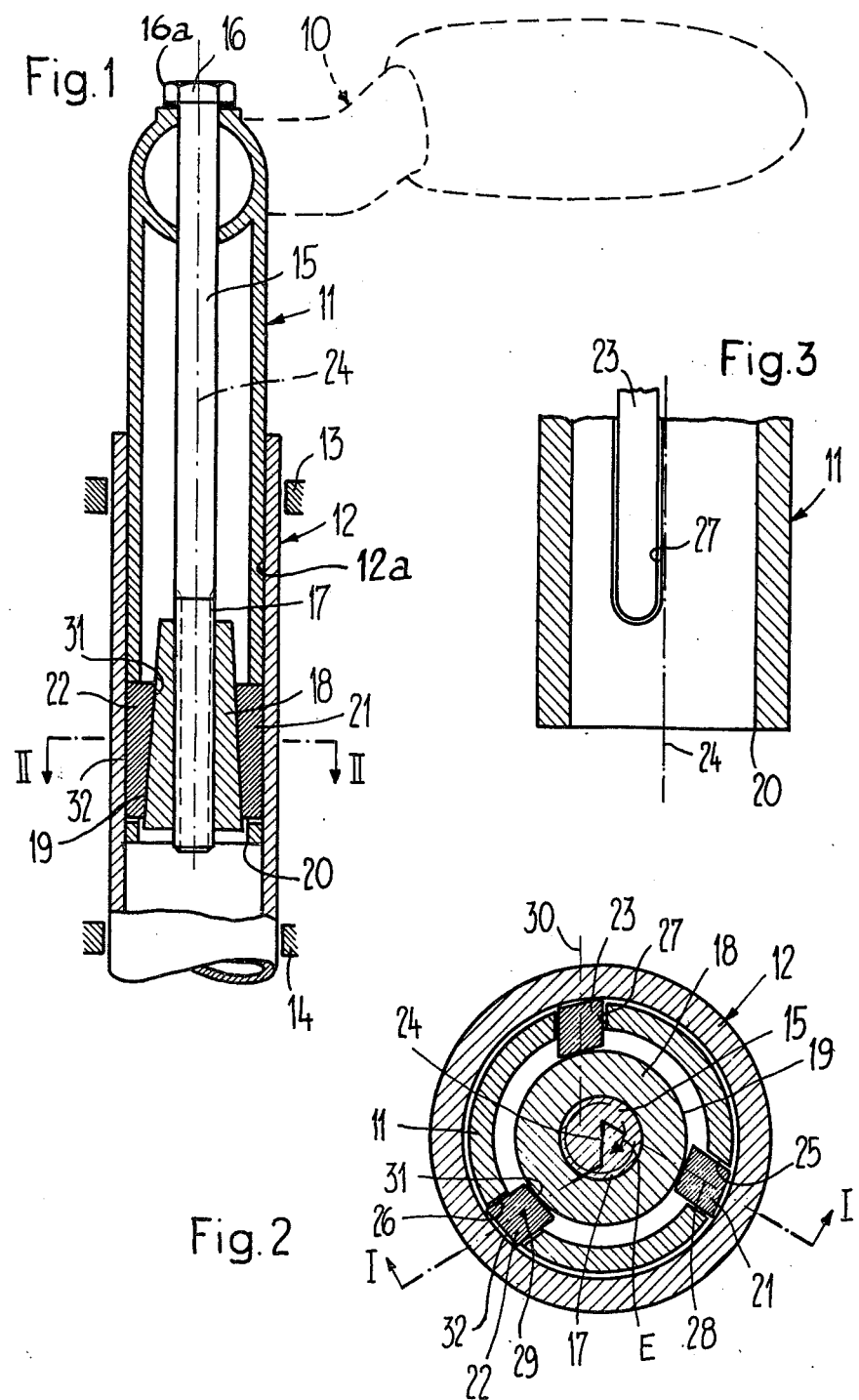

APPARATUS FOR THE RELEASABLE FORCE-LOCKING OF TWO TELESCOPIC TUBES, ESPECIALLY FOR CLAMPING THE STEERING HOUSING TUBE IN THE STEERING FORK TUBE OF A BICYCLE

BACKGROUND OF THE INVENTION

The present invention relates to a new and improved construction of apparatus for the releasable, force-locking or frictional clamping or connection of two tubes which are arranged within one another, in other words telescopic tubes, especially for clamping the steering housing tube in the steering fork tube of a bicycle or the like, there being provided an expanding cone axially displaceable within the inner one of the aforementioned tubes by means of a threaded spindle.

With heretofore known apparatuses of this type the inner end of the inner tube is subdivided by separation cuts into a number of, usually two, flaps or tabs and the outer surface of the expanding cone acts upon the inner end edge of each of these flaps or tabs. During tightening of the threaded spindle these flaps are spread outwardly and only just their outer end edge comes into line-like, force-locking or frictional engagement with the inner jacket surface of the outer tube. Since the play between the outer tube and the inner tube, as a practical manner, cannot be avoided, this results in a force-locking arrestment only along a circular-shaped contact line between the inner tube and the outer tube, which arrestment or locking action is not capable of withstanding any larger forces. A more forceful tightening of the threaded spindle, on the one hand, can lead to a further deformation of the flaps at the end of the inner tube, and, on the other hand, to pitting or so-to-speak "eating away" of the inner jacket surface of the outer tube, without there having been obtained any advantage. This is particularly then disadvantageous when a bending moment acts upon both tubes and at the same time there should be transmitted a torque or rotational moment from the one to the other tube.

SUMMARY OF THE INVENTION

Hence, with the foregoing in mind it is a primary object of the present invention to provide a new and improved construction of apparatus for the releasable, force-locking connection of two telescopic tubes in a manner not associated with the aforementioned drawbacks and limitations of the prior art proposals.

Another and more specific object of the present invention aims at the provision of a new improved construction of apparatus of the previously mentioned type wherein the frictional connection is achieved over a certain axial length, and furthermore, the play brought about by manufacturing tolerances between the clamped tubes either is eliminated or does not come into effect, and without there having to be accepted any deformations.

Now in order to implement these and still further objects of the invention, which will become more readily apparent as the description proceeds, the proposed apparatus of the present development is manifested by the features that the jacket or outer surface of the expanding cone bears against wedges. These wedges are each arranged in a guide slot formed in the inner tube and having a closed outline or contour and extending parallel to the lengthwise axis of the tubes. These wedges can be displaced outwardly by means of the expanding cone, and the longitudinal central plane of at least one of the guide slots and its wedge is offset with regard to the lengthwise axis of the tubes.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic axial sectional view through a steering housing tube and the steering fork tube of a bicycle, taken substantially along the line I—I of FIG. 2;

FIG. 2 is a cross-sectional view of the arrangement of FIG. 1, taken substantially along the line II—II thereof; and FIG. 3 is a fragmentary sectional view through the lower end region of the steering housing tube.

DETAILED DESCRIPTION OF THE PREFERRED EMBODIMENTS

Describing now the drawings, in FIG. 1 there will be recognized in broken lines or phantom illustration the contour or outline of one half of a bicycle handlebar 10 at which there is centrally connected a steering housing tube 11. Usually the handlebar 10 is attached at the steering housing tube 11 by means of a tightening clamp or equivalent structure formed thereat, so that the handlebar 10 can be adjusted by rotation in relation to the steering housing tube 11 and locked in the adjusted position. Since this attachment by means of a tightening clamp or the like does not constitute part of the invention, further is unimportant for understanding the teachings thereof, it has not been shown in FIG. 1 to simplify the illustration.

The steering housing tube or steering tube 11 is telescopically inserted into a steering fork tube 12 and clamped or braced thereat. As to the two tubes 11 and 12 the insertable tube 11 thus defines what will be referred to sometimes herein as the inner tube 11 and the steering fork tube 12 will sometimes be referred to as the outer tube 12. The steering fork tube 12, as schematically indicated by reference characters 13 and 14, is rotatably mounted at a suitable and therefore not particularly shown bicycle frame.

Continuing, it will be observed by referring to FIG. 1 that a threaded spindle 15 or equivalent structure extends through the steering housing tube 11. The head 16 of the threaded spindle 15 is provided with an inner hexagonal portion, or, as specifically illustrated, with an outer hexagonal portion or head 16a which is accessible from the outside of the steering housing tube 11, as shown. The threaded spindle 15 has external threading or threads 17 onto which there is threaded an expanding member, here shown in the form of a truncated cone-shaped expanding cone 18. In contrast to heretofore known clamping devices the outer surface 19 of the expanding cone 18 does not act upon the inner end edge 20 of the steering housing tube 11, rather upon three wedges 21, 22 and 23 or equivalent structure, as best seen by referring to FIG. 2. These wedges 21, 22 and 23 are each displaceably mounted for movement towards the outside in a related slot 25, 26 and 27, respectively, formed at the end region of the steering housing tube 11 and extending parallel to the steering column axis 24 i.e., the lengthwise axis of the tubes 11 and 12.

The longitudinal central planes of the slots 25 to 27 (indicated in FIG. 2 with the broken lines 28 to 30) do not extend radially, i.e., do not extend through the lengthwise axis 24 of the steering column or steering tubes 11, 12, rather are offset with regard thereto. The purpose and effect of such arrangement will be considered more fully hereinafter. Basically, it is in principle immaterial to which side these longitudinal central planes are arranged in offset relationship. However, it is preferred to have an arrangement where, viewed in the direction of screwing-in of the threaded spindle 15, such longitudinal central planes are rearwardly offset or trailingly arranged with regard to the lengthwise axis 24, as illustrated in FIG. 2, where the threading or screwing-in direction has been indicated with the arrow E.

The basically mutually similarly constructed wedges 21, 22 and 23 each possess two oppositely situated engagement or contact surfaces 31 and 32 which can be planar or concave and convex, and are only designated in FIG. 1 for the wedge 22, enclosing therebetween an angle which corresponds approximately to half of the cone angle of the expanding cone 18. The concave, however preferably planar engagement or contact surface 31 thus bears, essentially over its entire length, at the outer surface or jacket of the expanding cone 18, whereas the convex or likewise preferably planar engagement or contact surface 32 always remains essentially parallel to the lengthwise axis 24 of the steering column, and thus, parallel to the generatrixes of the inner wall 12a of the steering fork tube 12.

As best seen by referring to FIG. 3, the outline of the wedges 21, 22 and 23 is approximately mirror-image with respect to the shape of the slots 25, 26 and 27, respectively, but, for reasons of fabrication, between the wedge and its related slot there remains a certain play both in the circumferential as well as also in the axial direction. Also the steering housing tube 11 always possesses, within the steering fork tube 12, a certain radial play, shown exaggerated in FIG. 2, and likewise governed by fabrication reasons. All such play is, by virtue of the proposed clamping or connection apparatus, either eliminated, or, however, remains without any detremental effect.

During tightening of the threaded spindle 15 the expanding cone 18 is tightened i.e., raised. As a result, firstly, it forces the wedges 21, 22 and 23 towards the outside and presses them against the inner wall 12a of the steering fork tube 12. Secondly, however, the wedges 21, 22 and 23, upon expansion by the expanding cone 18, are also tilted or canted within the slots 25, 26 and 27, respectively, and thus clamp or bind at the steering housing tube 11. This is so, because, as already mentioned, the longitudinal central planes 28, 29 and 30 of the wedges 21, 22 and 23, and along therewith, also the slots 25, 26 and 27, respectively, are arranged offset in relation to the lengthwise axis 24 of the tubes 11 and 12.

It is not absolutely necessary that the longitudinal central planes of all of the slots and wedges are offset with respect to the lengthwise axis of the tubes. The described canting or tilting action of the wedges within their slots and the effect thereof (fixedly clamping the side edges of each slot at the side flanks or edges of the related wedge) can also be achieved if only one of the longitudinal central planes is offset.

Is has been found that the described clamping device or apparatus also is capable of withstanding appreciable bending loads of the steering housing tube. These loads occur especially then when the bicyclist, for the purpose of increasing the peddling force, pushes his body downwardly in that he exerts a traction force upwardly at the handlebars.

While the invention has been conveniently described in conjunction with a steering housing tube and a steering fork tube of a bicycle, it should of course be understood that the described clamping apparatus also can be used in other fields of application, for instance for the fabrication of tubular furniture, such as steel tubing furniture, tubular frames and the like.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An apparatus for the releasable, force-locking connection of two telescopic tubes, especially for clamping the steering housing tube within the steering fork tube of a bicycle, comprising:
   a first and second tube defining an inner tube and an outer tube telescopically arranged with respect to one another;
   an expanding cone;
   a threaded spindle for axially displaceably arranging the expanding cone within the inner tube;
   said expanding cone having an outer surface;
   said inner tube having a number of guide slots;
   each guide slot having an essentially closed outline and extending essentially parallel to the lengthwise axis of the tubes;
   a respective wedge arranged within each guide slot;
   said expanding cone coacting with the wedges for outward displacement of said wedges;
   the longitudinal plane of at least one of the guide slots and its related wedge being arranged in offset relationship in relation to the lengthwise axis of the tubes.

2. The apparatus as defined in claim 1, wherein:
   said guide slots comprise three guide slots uniformly distributed in angular relationship about the lengthwise axis of the tubes and arranged at an end region of the inner tube.

3. The apparatus as defined in claim 2, wherein:
   the longitudinal central planes of each of the three guide slots and their wedges, viewed in the circumferential direction, are arranged in offset relationship in the same sense with respect to the lengthwise axis of the tubes.

4. The apparatus as defined in claim 1, wherein:
   each of the wedges have a contact surface confronting the outer surface of the expanding cone; and
   each such contact surface of the wedges being substantially planar.

5. The apparatus as defined in claim 4, wherein:
   each of said wedges has a contact surface confronting an inner surface of the outer tube.

6. The apparatus as defined in claim 5, wherein:
   said contact surfaces confronting the inner surface of the outer tube being substantially flat.

7. The apparatus as defined in claim 5, wherein:
   the contact surfaces confronting the inner surface of the outer tube being substantially convex.

8. The apparatus as defined in claim 1, wherein:
   each of said guide slots has side walls; and one of the side walls of at least one of the guide slots being located in a plane extending through the lengthwise axis of the tubes.

9. The apparatus as defined in claim 1, wherein:
said threaded spindle has a thread-in direction; and
the longitudinal central planes, viewed in the thread-in direction of the threaded spindle, being arranged in rearwardly offset relationship with respect to the lengthwise axis of the tubes.

10. An apparatus for the releasable connection of two telescopic tubes, comprising:
a first and second tube defining an inner tube and an outer tube telescopically arranged with respect to one another;
said tubes having a lengthwise extending axis;
an expanding cone;
means for axially displaceably arranging the expanding cone within the inner tube;
said expanding cone having an outer surface;
said inner tube having a number of guide slots;
each guide slot extending essentially parallel to the lengthwise axis of the tubes;
a respective wedge arranged within each guide slot;
said expanding cone coacting with the wedges for outward displacement of said wedges;
the longitudinal central plane of at least one of the guide slots and its related wedge being arranged in offset relationship in relation to the lengthwise axis of the tubes.

* * * * *